(12) United States Patent  (10) Patent No.: US 8,453,158 B2
Ma et al.  (45) Date of Patent:  May 28, 2013

(54) METHOD, APPARATUS, AND SYSTEM FOR ENHANCING APPLICATION RELIABILITY OF A SCRIPT-BASED SERVICE

(75) Inventors: Qifeng Ma, Shenzhen (CN); Xiaomin Shi, Makati (PH)

(73) Assignee: Huawei Technologies Co., Ltd., Shenzhen (CN)

( * ) Notice: Subject to any disclaimer, the term of this patent is extended or adjusted under 35 U.S.C. 154(b) by 103 days.

(21) Appl. No.: 13/086,835

(22) Filed: Apr. 14, 2011

(65) Prior Publication Data

US 2011/0191786 A1  Aug. 4, 2011

Related U.S. Application Data

(63) Continuation of application No. PCT/CN2009/073804, filed on Sep. 8, 2009.

(30) Foreign Application Priority Data

Oct. 17, 2008  (CN) .......................... 2008 1 0167276

(51) Int. Cl.
*G06F 9/44*  (2006.01)
*G06F 15/16*  (2006.01)

(52) U.S. Cl.
USPC .......................................... 719/311; 709/217

(58) Field of Classification Search
None
See application file for complete search history.

(56) References Cited

U.S. PATENT DOCUMENTS

| | | | |
|---|---|---|---|
| 2003/0105846 A1* | 6/2003 | Zhao et al. | .................... 709/221 |
| 2005/0198206 A1 | 9/2005 | Miller et al. | |
| 2005/0278307 A1 | 12/2005 | Battagin et al. | |
| 2006/0259578 A1 | 11/2006 | Fritsch et al. | |
| 2007/0050446 A1 | 3/2007 | Moore | |
| 2007/0055693 A1 | 3/2007 | Galbraith et al. | |
| 2007/0143496 A1* | 6/2007 | Golovinsky et al. | .......... 709/238 |
| 2007/0233782 A1 | 10/2007 | Tali | |

(Continued)

FOREIGN PATENT DOCUMENTS

| | | |
|---|---|---|
| CN | 1555012 A | 12/2004 |
| CN | 1728149 A | 2/2006 |

(Continued)

OTHER PUBLICATIONS

International Search Report from the Chinese Patent Office in International Application No. PCT/CN2009/073804, mailed Dec. 17, 2009.
Extended European Search Report dated (mailed) Apr. 3, 2012, issued in related Application No. 09820218.7-2413, PCT/CN2009073804 Hauwei Technologies Co., Ltd.
Communication from a foreign counterpart application, Chinese Application No. 200810167276.3, Partial English translation, Office Action dated Aug. 3, 2012, 5 pages.

(Continued)

*Primary Examiner* — Charles E Anya
(74) *Attorney, Agent, or Firm* — Conley Rose, P.C.; Grant Rodolph; Nicholas K. Beaulieu (57) ABSTRACT

A method, an apparatus, and a system for enhancing application reliability of a script-based service are disclosed. The method includes: analyzing data source information of a script-based service; obtaining current state information of the data source of the script-based service according to the analysis result; and judging the availability state of the script-based service according to the obtained current state information. With the technical solution of the present invention, a related analysis function is added to a script-based service server to analyze related data source information in the script-based service logic and mark the script-based service. In this way, a user can know the state of the script-based service when requesting a service, thus avoiding unnecessary service trials, saving system resources, and improving the user experience.

15 Claims, 7 Drawing Sheets

U.S. PATENT DOCUMENTS

2008/0209348 A1* 8/2008 Grechanik et al. ............ 715/762
2008/0244091 A1* 10/2008 Moore et al. .................. 709/246
2010/0153862 A1* 6/2010 Schreiber ...................... 715/760

FOREIGN PATENT DOCUMENTS

| CN | 101005502 A | 7/2007 |
|---|---|---|
| CN | 101202665 A | 6/2008 |
| WO | WO 2005114411 A1 | 12/2005 |
| WO | WO 2008/075883 A1 | 6/2008 |

OTHER PUBLICATIONS

Communication from a foreign counterpart application, Chinese Application No. 200810167276.3, Office Action dated Aug. 3, 2012, 7 pages.

Communication from a foreign counterpart application, PCT Application No. PCT/CN2009/073804, English translation, Written Opinion dated Dec. 17, 2009, 5 pages.

* cited by examiner

METHOD, APPARATUS, AND SYSTEM FOR ENHANCING APPLICATION RELIABILITY OF A SCRIPT-BASED SERVICE

CROSS-REFERENCE TO RELATED APPLICATIONS

This application is a continuation of International Application No. PCT/CN2009/073804, filed on Sep. 8, 2009, which claims priority to Chinese Patent Application No. 200810167276.3, filed on Oct. 17, 2008, both of which are hereby incorporated by reference in their entireties.

FIELD OF THE INVENTION

The present invention relates to communication technologies, and in particular, to a method, an apparatus, and a system for enhancing application reliability of a script-based service.

BACKGROUND OF THE INVENTION

A Mashup service is an emerging web-based data integration application. The Mashup is a new web application that is formed by stacking and aggregating different applications supporting Web application programming interfaces (APIs). The Mashup creates a service by using contents retrieved from external data sources. It combines the contents from more than one data source, and creates a more valuable service. The Mashup can use external data sources of various formats. It is compatible with various interfaces, such as public application programming interfaces (Public APIs), the feeds interface corresponding to such language formats as extensible markup language (XML)/really simple syndication (RSS)/Atom, web service interface, and hypertext markup language (HTML) interface. It is generally accepted that the Mashup has features of Web 2.0. Web 2.0 establishes a shared information platform on the Internet. The Mashup technology is based on the fact that various web applications contribute respective services and contents and also use information and services provided by other users and organizations. As more and more web sites make public their own APIs, a lot of people already construct new Mashups by using eBay, Amazon, Google, and Yahoo, and thus the new web application model comes into being.

With the increasing popularity of the Mashup service, the Mashup may become an important model for generating and creating Telecommunications and Internet converged services.

Currently, the Mashup focuses on how to create new applications by combining the existing sub services and resources on the network. As more and more users participate in the creation of Mashup services, the Mashup services become more and more diversified and so are the Mashup services available to common users. With the explosive growth of the Mashup services, it is more difficult to guarantee and manage the quality including reliability of the Mashup services. Because the normal operation of the Mashup services cannot be guaranteed before a user uses the Mashup services, the user experience on the applications of the Mashup is greatly affected.

Currently, the Mashup server is generally a web integration platform, allowing users to easily integrate data and functions from any applications with the web interface.

In an application architecture of the Mashup in the prior art, the core function of the Mashup is to integrate the data and services and demonstrate the integrated service to users, including an API/content provider, a Mashup server, and a Mashup client. In the application architecture in the prior art, the information content used by the Mashup server may not be the local content on the Mashup server, and may also be obtained from the web server in remote access mode. This is the most common Mashup service, and is generally known as RSS. In this case, the Mashup server is responsible for processing all the functions. That is, all the services and data needed by the Mashup application are called and processed by the server. In addition, calling the web service is common In this case, the Mashup server is responsible for editing and executing application logics. The specific service calling information and data processing information are notified by the Mashup server to the Mashup client; the Mashup client calls and processes the service and data directly. Currently, there are a lot of web services description language (WSDL)-based web services and representational state transfer (Rest)-based web services that provide clear calling APIs, thus enriching the Mashup services.

During the implementation of the present invention, the inventor discovers at least the following problems in the prior art:

In the prior art, the Mashup server cannot detect data sources of the Mashup service and nor can it obtain update results of the data source information in time. Thus, the availability of the Mashup service cannot be guaranteed, the application reliability of the Mashup service is reduced, and the user experience is impaired.

SUMMARY OF THE INVENTION

Embodiments of the present invention provide a method, an apparatus, and a system for enhancing application reliability of a script-based service to overcome the problem that a script-based server similar to the Mashup server cannot detect data sources of a script-based service and cannot obtain update results of the data source information in time. Embodiments of the present invention are intended to ensure the availability of the script-based service and enhance the reliability of the script-based service.

To achieve the above objective, a method for enhancing application reliability of a script-based service includes:

analyzing data source information of the script-based service;

obtaining current state information of a data source of the script-based service according to the analysis result; and determining the availability state of the script-based service according to the obtained current state information.

A script-based service server includes:

an analyzing module, configured to analyze data source information of a script-based service;

an obtaining module, configured to obtain current state information of a data source of the script-based service according to the analysis result of the analyzing module; and a judging module, configured to judge the availability state of the script-based service according to the current state information obtained by the obtaining module.

A service access management system includes:

a receiving module, configured to receive a state information subscription request sent from a script-based service server, where the request is intended to subscribe to the state information of a data source of a script-based service;

a data source information obtaining module, configured to obtain the state information of the data source of the script-based service according to the state information subscription request received by the receiving module; and a sending module, configured to send the current state information of the data source of the script-based service that is obtained by the data source information obtaining module to the script-based service server.

A script-based service system includes a script-based service server and a service access management system.

The script-based service server is configured to: provide functions of creating, executing, and managing a script-based service, and subscribe to the state information of a data source of the script-based service from the service access management system.

The service access management system is configured to: maintain the data source information on the network, and receive and process the subscription request of the script-based service server.

The technical solution provided in embodiments of the present invention has the following merits: An analyzing module is added to the script-based service server to analyze related data source information in the script-based service logic; the availability state of the data source of the script-based service is marked, and the state of the data source is detected when the data source is unavailable. In this way, the problem that the script-based server cannot detect the application data source of the script-based service and cannot obtain the updated data source information in time is solved. Thus, the availability of the script-based service is guaranteed, and the reliability of the script-based service is enhanced. This ensures that the user may know the state of the script-based service when requesting a service, thus avoiding unnecessary service trials, saving system resources, and improving the user experience.

BRIEF DESCRIPTION OF THE DRAWINGS

The accompanying drawings are provided herein to help further understand the present invention and constitute a part of the application without limiting the present invention. In the accompanying drawings.

DETAILED DESCRIPTION OF THE EMBODIMENTS

For better understanding of the objective, technical solution, and merit of the present invention, the present invention is hereinafter described in detail with reference to the accompanying drawings and preferred embodiments. Preferred embodiments and descriptions thereof are used to explain the present invention, and not intended to limit the present invention.

Embodiments of the present invention provide a solution to the problems that script-based service servers (a typical example is the Mashup server) cannot detect data sources of a script-based service and the availability of the script-based service cannot be guaranteed.

An analyzing module is added to the script-based service server to analyze related data source information (including service information) in the script-based service logic; the script-based service is marked according to the analysis result so that the data source state is verified when the script-based service is executed. Further, when the data source corresponding to the script-based service is unavailable, the state of the data source is detected, and a request is sent to the service access management system to subscribe to the state information of the data source. In this way, the problem that the script-based server cannot detect the data source of the script-based service and cannot obtain the update result of the data source in time is solved, and the availability of the script-based service is guaranteed. Thus, a user may know the state of the script-based service when requesting a service, avoiding unnecessary service trials. In addition, with respect to the problem that the script-based service is unavailable due to the change of interfaces between data sources of the script-based service, the logic of the script-based service is automatically updated by enhancing the conversion rules or other replaceable sub services provided by the script-based service and data sources. Thus, the flexibility of the script-based service is improved, and the availability of the script-based service is enhanced.

For better description, in embodiments of the present invention, the technical solution is described based on the Mashup service. However, the embodiments are only preferred embodiments of the present invention, and do not affect the scope of the present invention.

Embodiment 1

Figure 1:
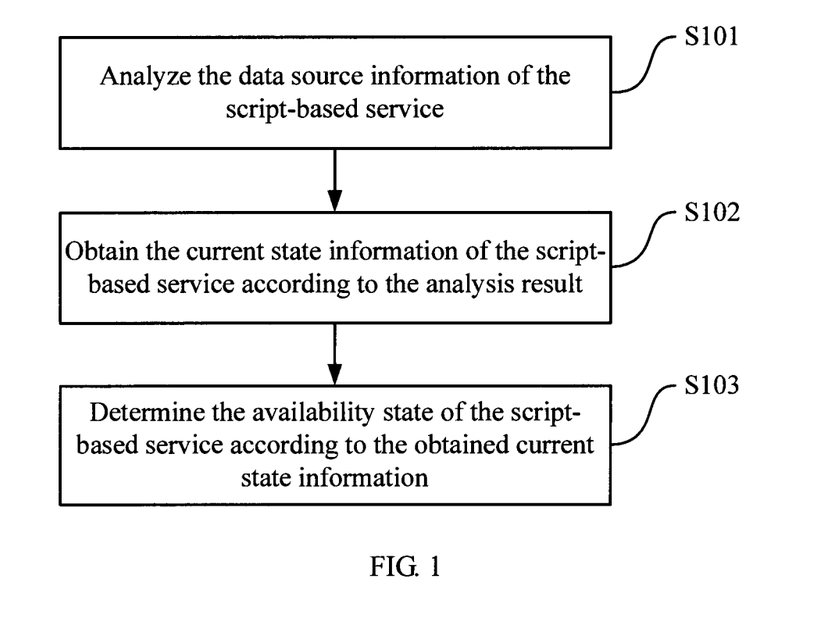
FIG. 1 is a flowchart of a method for enhancing application reliability of a script-based service according to a first embodiment of the present invention.

FIG. 1 is a flowchart of a method for enhancing application reliability of a script-based service in the first embodiment of the present invention. The method includes the following steps:

Step S101: Analyze data source information of the script-based service.

This step may be triggered by the following two steps:

(1) receiving a request for creating a script-based service from a user; or (2) receiving a request for detecting the availability state of the script-based service.

The step of receiving the request for detecting the availability state of the script-based service includes:

when a request for executing the script-based service is received from the user and it is determined that the current availability state of the script-based service is unavailable, judging whether to detect the availability state of the script-based service; and if the judgment result is positive, generating a request for detecting the availability state of the script-based service; or receiving a request for detecting the availability state of the script-based service directly from the user.

The step of judging whether to detect the availability state of the script-based service includes judging by identifying the data source detection label of the script-based service.

Step S102: Obtain the current state information of the script-based service according to the analysis result. This step includes:

sending a state information subscription request for subscribing to the state information of the data source to a service access management system according to the analysis result of the data source information of the script-based service; and receiving the current state information of the data source of the script-based service reported by the service access management system.

When receiving the current state information, the step further includes:

receiving a state information conversion rule reported by the service access management system, where the state information conversion rule includes:

(1) converting an invalid address and interface of the state information into an updated address and interface; and (2) an alternative data source replacement rule, configured to replace the invalid data source information used by the script-based service with other updated data information.

When the data source information of the script-based service is changed, the step further includes: receiving updated current state information of the data source of the script-based service reported by the service access management system.

Step S103: Determine the availability state of the script-based service according to the obtained current state information.

It should be noted that the step of storing the availability state information of the script-based service may be included after step S103 and also falls within the scope of the present invention.

Further, step S103 involves the following three cases:

Case 1: When it is determined that the availability state of the script-based service is available according to the obtained current state information, mark the availability state of the script-based service as available.

Case 2: When it is determined that the availability state of the script-based service is unavailable according to the obtained current state information and the state information conversion rule reported by the service access management system is not received, mark the availability state of the script-based service as unavailable.

Case 3: When it is determined that the availability state of the script-based service is unavailable according to the obtained current state information and the state information conversion rule reported by the service access management system is received, perform conversion matching on the current state information of the script-based service according to the state information conversion rule; when the conversion matching succeeds, mark the availability state of the script-based service as available; when the conversion matching fails, mark the availability state of the script-based service as unavailable.

Corresponding to the above cases of receiving information, the following three cases are involved after step S103:

Case 1: If the request for creating a script-based service is received from the user, return a script-based service creation result to the user.

Case 2: If the request for executing the script-based service is received from the user, when the availability state of the script-based service is available, execute the script-based service; when the availability state of the script-based service is unavailable, give up executing the script-based service, and return information indicating that the script-based service is non-executable to the user.

Case 3: If a request for detecting the availability state of the script-based service is received directly from the user, return the state detection result of the script-based service to the user.

It should be noted that a registration and access process of a third party data source may be included before step S101. The process includes:

receiving a service adapter registration request sent from the third party data source; and accessing the private service data of the third party data source through the service adapter.

The technical solution provided in the first embodiment of the present invention has the following merits:

The information of the data source of the script-based service is analyzed; the state information of the data source is obtained through subscription; and the availability state of the data source of the script-based service is marked according to the state information. Optionally, the marking result may be stored as a reference for subsequent availability detection of the script-based service. Thus, the problem that the script-based server cannot detect the current state of the data source of the script-based service is solved.

When the state of the data source is unavailable, state detection and adaptation are performed on the data source, which solves the problem that the script-based server cannot obtain the update result of the data source information in time.

The adaptation with the third party data source extends various scrip-based services.

With the foregoing multiple technical measures, the availability of the script-based service is guaranteed, and the reliability of the script-based service is enhanced. In this way, the user can know the state of the script-based service when requesting a service, thus avoiding unnecessary service trials, saving system resources, and improving the user experience.

Embodiment 2

Figure 2:
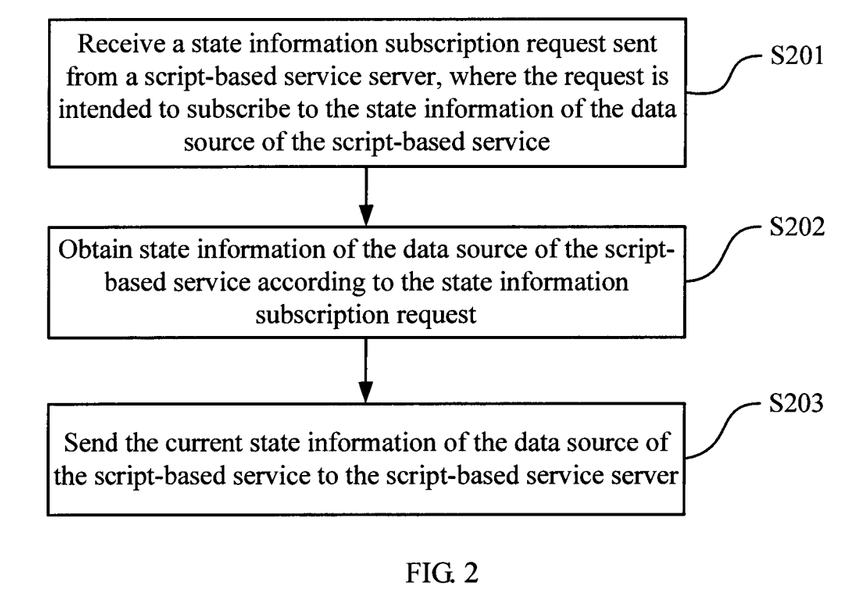
FIG. 2 is a flowchart of a method for enhancing application reliability of a script-based service according to a second embodiment of the present invention.

FIG. 2 is a flowchart of a method for enhancing application reliability of a script-based service in the embodiment of the present invention. The method includes the following steps:

Step S201: Receive a state information subscription request sent from a script-based service server, where the request is intended to subscribe to the state information of the data source of the script-based service.

Step S202: Obtain state information of the data source of the script-based service according to the state information subscription request.

Step S203: Send the current state information of the data source of the script-based service to the script-based service server.

When the state information of the data source of the script-based service is changed, step S203 may be as follows: Report the changed state information of the data source of the script-based service and a data source conversion rule to the script-based service server.

The technical solution provided in the second embodiment of the present invention has the following merits: A subscription request for subscribing to the state information of the data source is received from the script-based service server; the current state information of the data source is fed back; and the information change is reported when the data source information is changed. In this way, the change of the data source information can be fed back and managed in time. In addition, the data source conversion rule is reported, so that the data source information is changed and converted and the reliability of the script-based service is enhanced. In this way, the availability of the script-based service is guaranteed, and the user may know the state of the script-based service when requesting a service. Thus, unnecessary service trials are avoided, system resources are saved, and the user experience is improved.

Embodiment 3

Figure 3:
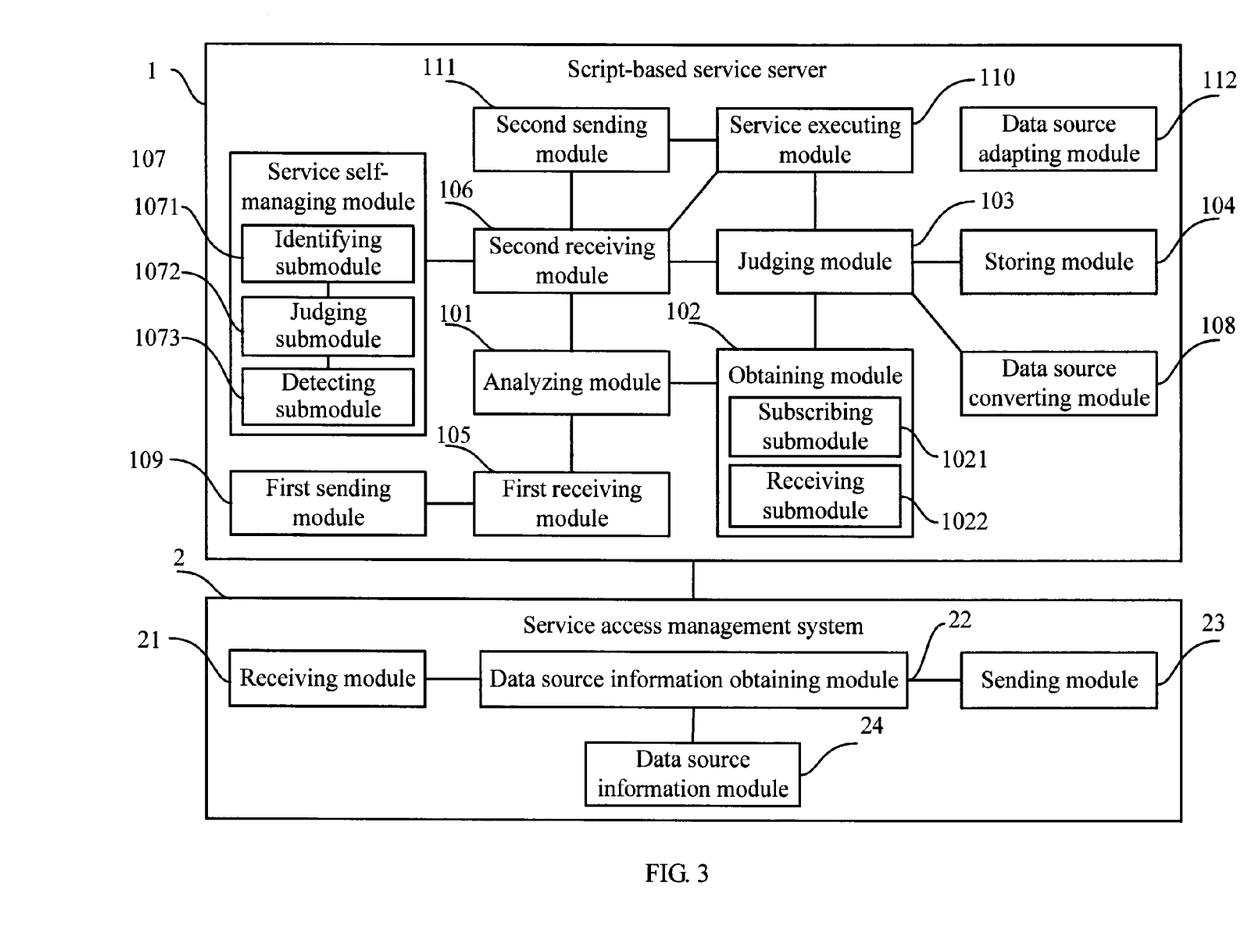
FIG. 3 shows a structure of a script-based service system according to a third embodiment of the present invention.

Corresponding to the first embodiment and the second embodiment, the third embodiment of the present invention provides a script-based service system. As shown in FIG. 3, the script-based service system includes a script-based service server 1 and a service access management system 2.

The script-based service server 1 is configured to: provide functions of creating, executing, and managing a script-based service, and subscribe to the state information of the data source of the script-based service from the service access management system 2. The script-based service server 1 includes an analyzing module 101, an obtaining module 102, and a judging module 103.

The analyzing module 101 is configured to analyze data source information of the script-based service.

The obtaining module 102 is configured to obtain current state information of the data source of the script-based service according to the analysis result of the analyzing module 101. Specifically, the obtaining module 102 includes:

a subscribing submodule 1021, configured to send a state information subscription request for subscribing to the state information of the data source to the service access management system 2 according to the analysis result of the analyzing module 101; and a receiving submodule 1022, configured to receive current state information of the data source of the script-based service reported by the service access management system 2 and/or receive a state information conversion rule reported by the service access management system 2.

The judging module 103 is configured to judge the availability state of the script-based service according to the current state information obtained by the obtaining module 102.

Further, the script-based service server 1 includes a storing module 104, a first receiving module 105, a second receiving module 106, a service self-managing module 107, and a data source converting module 108.

The storing module 104 is configured to store the judgment result of the availability state of the script-based service made by the judging module 103 according to the availability state information of the script-based service. In actual scenarios, the storing module 104 may be configured on the script-based service server 1 or other servers, without affecting the scope of the present invention.

The first receiving module 105 is configured to receive a request for creating the script-based service from the user.

The second receiving module 106 is configured to receive a request for executing the script-based service from the user, or receive a request for detecting the availability state of the script-based service.

The service self-managing module 107 is configured to generate a request for detecting the availability state of the script-based service according to the request for executing the script-based service that the second receiving module 106 receives from the user. Specifically, the service self-managing module 107 includes:

an identifying submodule 1071, configured to identify the current availability state of the script-based service;

a judging submodule 1072, configured to judge whether to detect the availability state of the script-based service when the identifying submodule 1071 determines that the current availability state of the script-based service is unavailable; and a detecting submodule 1073, configured to generate a request for detecting the availability state of the script-based service when the judgment result of the judging submodule 1072 is that the availability state of the script-based service needs to be detected.

The data source converting module 108 is configured to perform conversion matching on the current state information of the script-based service according to the state information conversion rule when the judging module 103 determines that the availability state of the script-based service is unavailable and the receiving submodule 1022 receives the state information conversion rule reported by the service access management system 2.

Further, the script-based service server 1 includes a first sending module 109, a service executing module 110, a second sending module 111, and a data source adapting module 112.

The first sending module 109 is configured to return a script-based service creation result to the user if the first receiving module 105 receives the request for creating the script-based service from the user.

The service executing module 110 is configured to execute the script-based service if the second receiving module 106 receives the request for executing the script-based service and when the judging module 103 determines that the availability state of the script-based service is available.

The second sending module 111 is configured to return the execution result of the script-based service of the service executing module 110 if the second receiving module 106 receives a request for executing the script-based service from the user, or configured to return the state detection result of the script-based service to the user if the second receiving module 106 receives a request for detecting the availability state of the script-based service directly from the user.

The data source adapting module 112 is configured to provide a non-open data source access function, and provide a third party service provider with a data source adapter so that the script-based service server can access a third party private data source.

The service access management system 2 is configured to: maintain the data source information on the network, and receive and process the subscription request of the script-based service server 1.

The service access management system 2 is further configured to report changed state information of the data source of the script-based service and a data source conversion rule to the script-based service server 1 when the state information of the data source of the script-based service is changed.

The service access management system 2 includes:

a receiving module 21, configured to receive a state information subscription request sent from the script-based service server 1, where the request is intended to subscribe to the state information of the data source of the script-based service;

a data source information obtaining module 22, configured to obtain the state information of the data source of the script-based service according to the state information subscription request received by the receiving module 21; and a sending module 23, configured to send the current state information of the data source of the script-based service that is obtained by the data source information obtaining module 22 to the script-based service server 1.

The sending module 23 is further configured to report changed state information of the data source of the script-based service and a data source conversion rule to the script-based service server 1 when the state information of the data source of the script-based service is changed.

Further, the service access management system 2 includes:

a data source information module 24, configured to store data source information of the script-based service.

The preceding modules may be distributed on one apparatus or multiple apparatuses. The preceding modules may be combined into one, or split into several submodules.

The technical solution provided in the third embodiment of the present invention has the following merits:

Related functional modules such as an analyzing module, an obtaining module, and a judging module are added to the script-based server; the data source information of the script-based service is analyzed by the analyzing module; the state information of the data source is obtained through subscription; the availability state of the data source of the script-based service is marked according to the state information. Optionally, a storing module may be added to store the marking result that serves as a reference for subsequent availability detection of the script-based service. Thus, the problem that the script-based server cannot detect the current state of the data source of the script-based service is solved.

In addition, when the state of the data source is unavailable, state detection and adaptation are performed on the data source, which solves the problem that the script-based server cannot obtain the update result of the data source information in time.

The adaptation with the third party data source extends various scrip-based services.

With the foregoing multiple technical measures, the availability of the script-based service is guaranteed, and the reliability of the script-based service is enhanced. In this way, the user can know the state of the script-based service when requesting a service, thus avoiding unnecessary service trials, saving system resources, and improving the user experience.

In actual scenarios, the preceding apparatuses and systems may be modified and changed, and the preceding modules may be combined into a module or split into multiple submodules.

Embodiment 4

Figure 4:
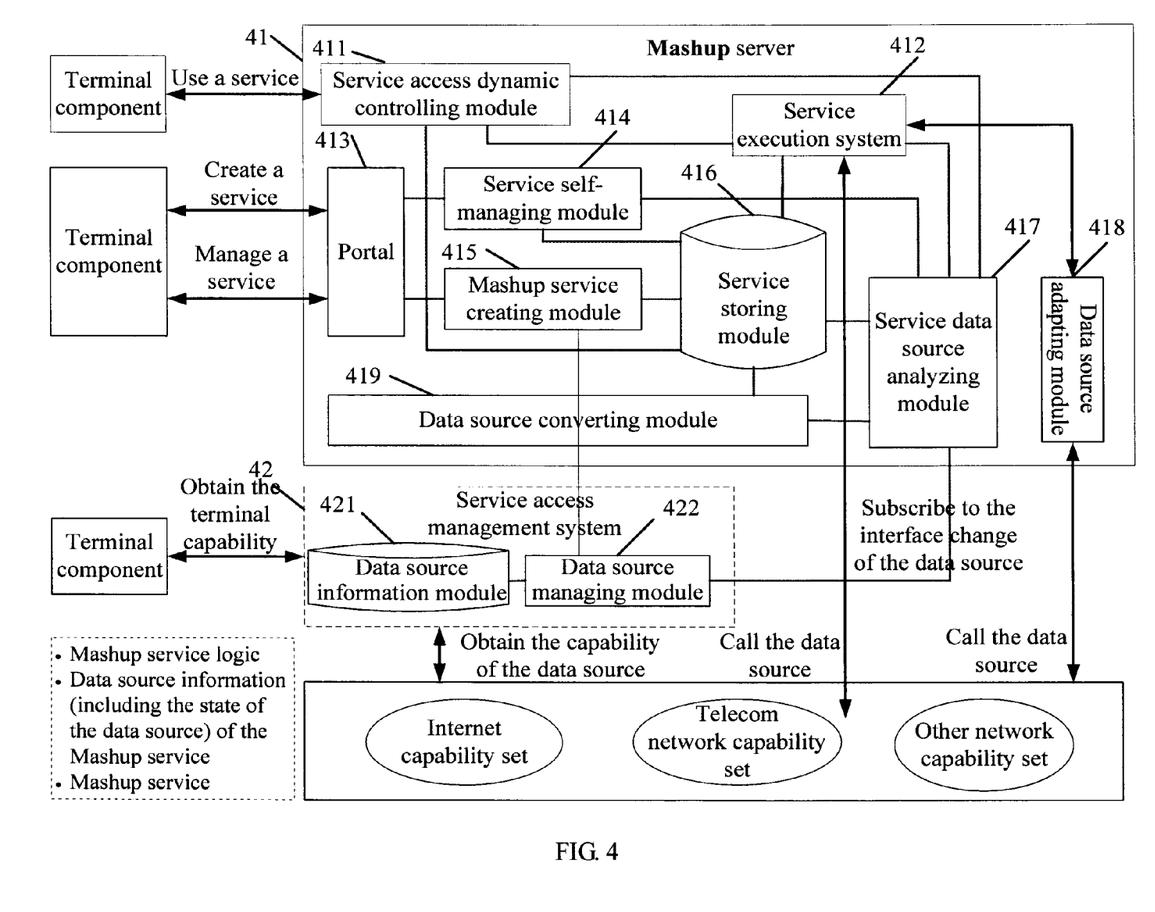
FIG. 4 shows a structure of a script-based service system that includes a Mashup server according to a fourth embodiment of the present invention.

FIG. 4 shows a structure of a script-based service system that includes a Mashup server in the fourth embodiment of the present invention. The script-based service system includes a Mashup server 41 and a service access management system 42.

The Mashup server 41 includes a service access dynamic controlling module 411, a Mashup execution system 412, a Portal 413, a service self-managing module 414, a service creating module 415, a service storing module 416, a data source analyzing module 417, a data source adapting module 418, and a data source converting module 419.

The Portal 413, the service creating module 415, and the Mashup execution system 412 are the same as those on a common Mashup server.

The service access dynamic controlling module 411 is configured to: analyze a request from the user to obtain a Mashup application that the user needs to access; detect the state information of the Mashup application; if the Mashup service is available, request the service execution system to execute the Mashup service logic; if the Mashup service is unavailable, judge whether to detect the state of a corresponding data source according to the service detection label; if detection is required, perform data source conversion matching on the Mashup service logic, mark the service state as available, and request the service execution system to execute the Mashup service logic; otherwise, notify the user that the Mashup service is unavailable.

The service self-managing module 414 is configured to provide end users with the Mashup service management function, so that the users may request the service data source analyzing module 417 to detect the service data source and update the state information of the Mashup service.

The service storing module 416 is responsible for storing the Mashup service logic, state information (available and unavailable) of the Mashup service logic, data source information of the Mashup service, and the data detection label.

The data source converting module 419 converts the data source called in a related Mashup service logic according to the data source conversion rule so that the data source is adaptable to new interface rules or replaceable with other equivalent data sources.

The service data source analyzing module 417 is responsible for analyzing the data source information used by the Mashup service logic and storing the data source information and the Mashup service logic to the service storing module 416. When the state of the data source is changed, the service data source analyzing module 417 analyzes the affected Mashup service logic in time, and updates the state of the service logic. If necessary, the service data source analyzing module 417 may also call the data source converting module 419 to update the original Mashup service according to the data source conversion rule and change the data source calling interface to a new interface or replace the data source with other equivalent data sources, thus guaranteeing the availability of the Mashup service logic.

The data source adapting module 418 provides a private non-open source access function. A lot of functions on the network do not provide open interfaces. To enable the Mashup service to use these data sources, a third party is required to provide an adapter. By using the adapter, the Mashup service can access the data source with a third party private interface. The adapter may be a segment of encapsulated codes or dynamic programs that are used by the Mashup server. The data source adapting module 418 supports a third party in registering with the data source adapter to help third party service providers better promote their services and data sources.

According to the preceding description, corresponding to the third embodiment of the present invention, the service access dynamic controlling module 411 is equivalent to an entity that integrates the functions of the analyzing module 101, the second receiving module 106, and the second sending module 111; the Mashup execution system 412 is equivalent to the service executing module 110; the Portal 413 is equivalent to an entity that integrates the functions of the first receiving module 105 and the first sending module 109; the service self-managing module 414 is equivalent to the service self-managing module 107; the service storing module 416 is equivalent to the storing module 104; the data source analyzing module 417 is equivalent to an entity that integrates the functions of the obtaining module 102 and the judging module 103; the data source adapting module 418 is equivalent to the data source adapting module 112; and the data source converting module 419 is equivalent to the data source converting module 108. Such changes do not affect the scope of the present invention.

The service access management system 42 includes a data source information module 421 and a data source managing module 422.

The data source information module 421 is configured to store related information such as the data source interface, state, and equivalent alternative sub services. The data source managing module 422 is responsible for obtaining related data source capabilities and handling the data source information subscription request of the Mashup server 41.

In addition, the data source information module 421 stores and provides a data source conversion rule, and may provide an equivalent replaceable sub service interface as the conversion rule when necessary so as to ensure that the Mashup service logic may run normally in the case of failure (interface change and service exit) of the original sub service.

Corresponding to the third embodiment of the present invention, the data source information module 421 may be equivalent to the data source information module 24; the data source managing module 422 is equivalent to an entity that integrates the functions of the receiving module 21, the data source information obtaining module 22, and the sending module 23. Such changes do not affect the scope of the present invention.

The technical solution provided in the fourth embodiment of the present invention has the following merits: A related analyzing module is added to the Mashup server to analyze related data source information (including service information) in the Mashup service logic and mark the Mashup service. In this way, the user can know the state of the Mashup service when requesting a service, thus avoiding unnecessary service trials, saving system resources, and improving the user experience.

Embodiment 5

Figure 5:
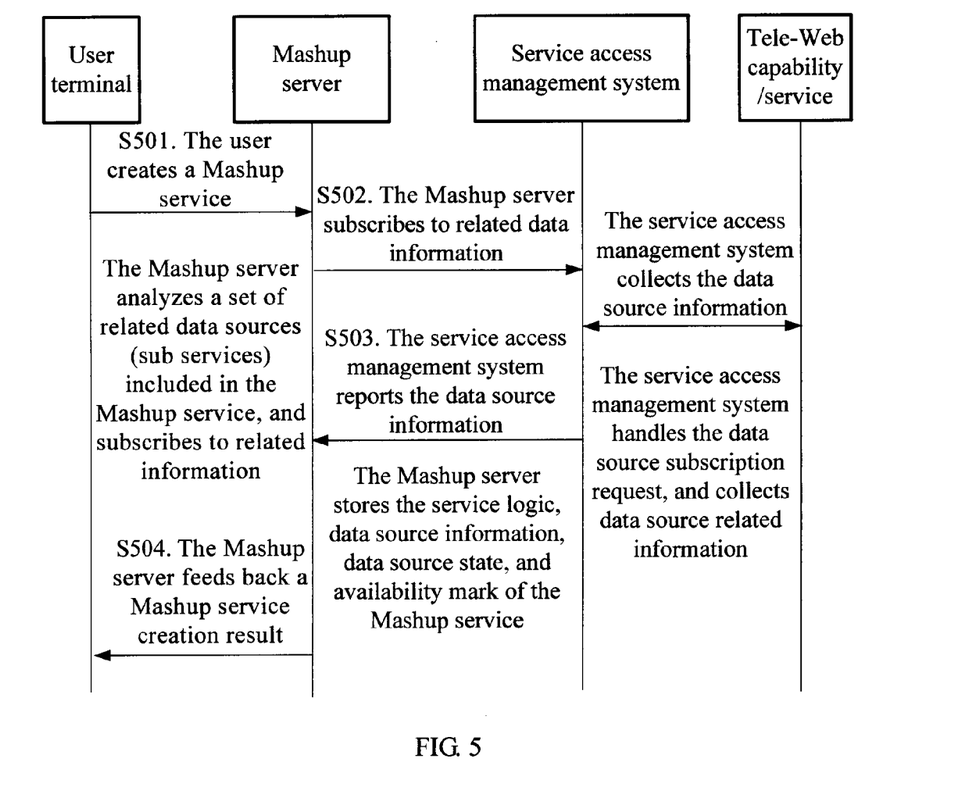
FIG. 5 shows a process of creating a Mashup service based on the system according to a fifth embodiment of the present invention.

Based on the system provided in the fourth embodiment of the present invention, the fifth embodiment provides a process of creating a Mashup service. As shown in FIG. 5, the process includes the following steps:

Step S501: The user creates a Mashup application through a Mashup service creation environment.

Step S502: When receiving a new Mashup service from the user, the Mashup server analyzes related data source information called by the Mashup service; if the Mashup service does not subscribe to the data source information, the Mashup server subscribes to related data source information from the service access management system.

Step S503: The service access management system receives a subscription request, and returns related data source information according to the state of the data source. If related data source information (such as the state, address, interface, and alternative equivalent service) is changed subsequently, the service access management system still reports the information.

Step S504: The Mashup server stores the service logic and related data source information, judges whether the current Mashup service logic is available according to the data source information, stores the information, and feeds back a Mashup service creation result (for example, creation success, immediate availability or temporary unavailability) to the user.

It should be noted that the service access management system may collect and obtain data source information through related ways, and manage the data source.

The technical solution provided in the fifth embodiment of the present invention has the following merits: Related data source information (including service information) in the new Mashup service logic is analyzed, and the state information of the data source is obtained through subscription, so that the availability state of the data source is judged and marked. In this way, the availability state information of the data source of the Mashup service is marked and updated in time, and the availability of the Mashup service is guaranteed.

Embodiment 6

Figure 6:
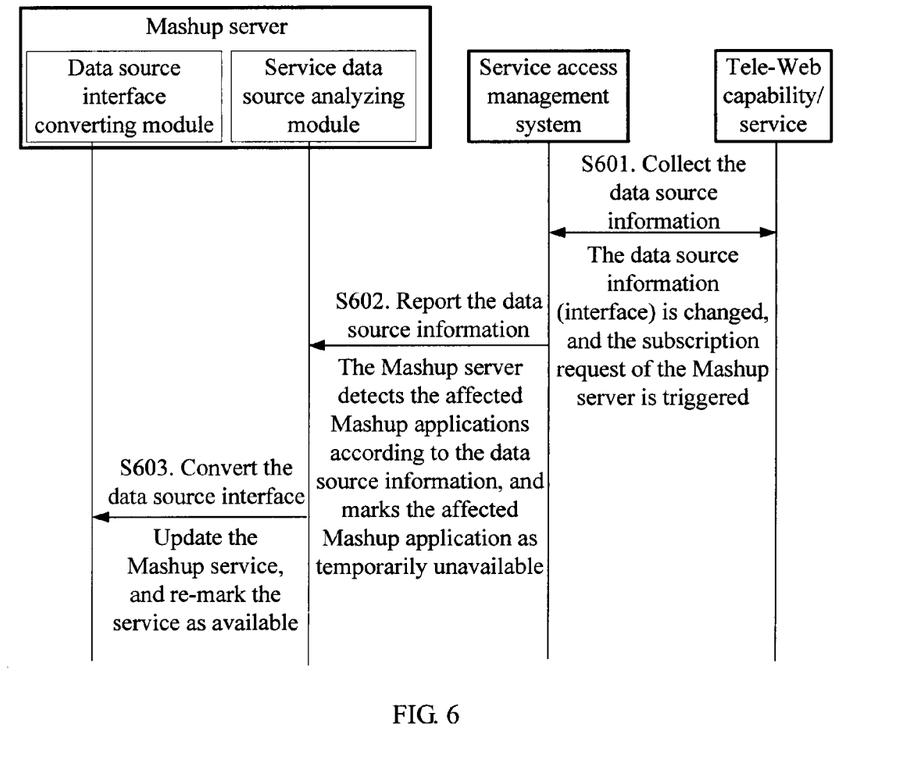
FIG. 6 shows a process of changing the address and interface of a data source based on the system i according to the fifth embodiment of the present invention.

Based on the system provided in the fourth embodiment of the present invention, the sixth embodiment provides a process of changing the address and interface of a data source. As shown in FIG. 6, the process includes the following steps:

Step S601: The service access management system obtains the change results of the state, address, and interface of the data source (for example, the data source reports the changes of the address and interface), and reports an address and interface change notification message (including the changes of the address and interface of the data source, rule for converting the old address and interface into a new address and a new interface, and an alternative equivalent data source) according to the subscription request of the Mashup server.

Step S602: The service data source analyzing module of the Mashup server updates the availability state of a related Mashup service logic according to the relationship between the Mashup service and the data source; if related address and interface conversion rules are available, the service data source analyzing module calls the data source converting module to convert the Mashup service logic.

Step S603: The data source converting module of the Mashup server processes the Mashup service logic according to related address and interface conversion rules (including the protocol, parameter type, parameter sequence, and alternative equivalent data source). After the process is completed, the data source converting module restores the availability mark of the converted Mashup service.

The technical solution provided in the sixth embodiment of the present invention has the following merits: A data source state information subscription request is received; the current state information of the data source and the subsequent state information change are reported in time. In this way, the accuracy of the state information of the data source on the Mashup server and the corresponding availability state can be guaranteed, which ensures that the user knows the state of the Mashup service when requesting a service, thus avoiding unnecessary service trials, saving system resources, and improving the user experience.

Embodiment 7

Figure 7:
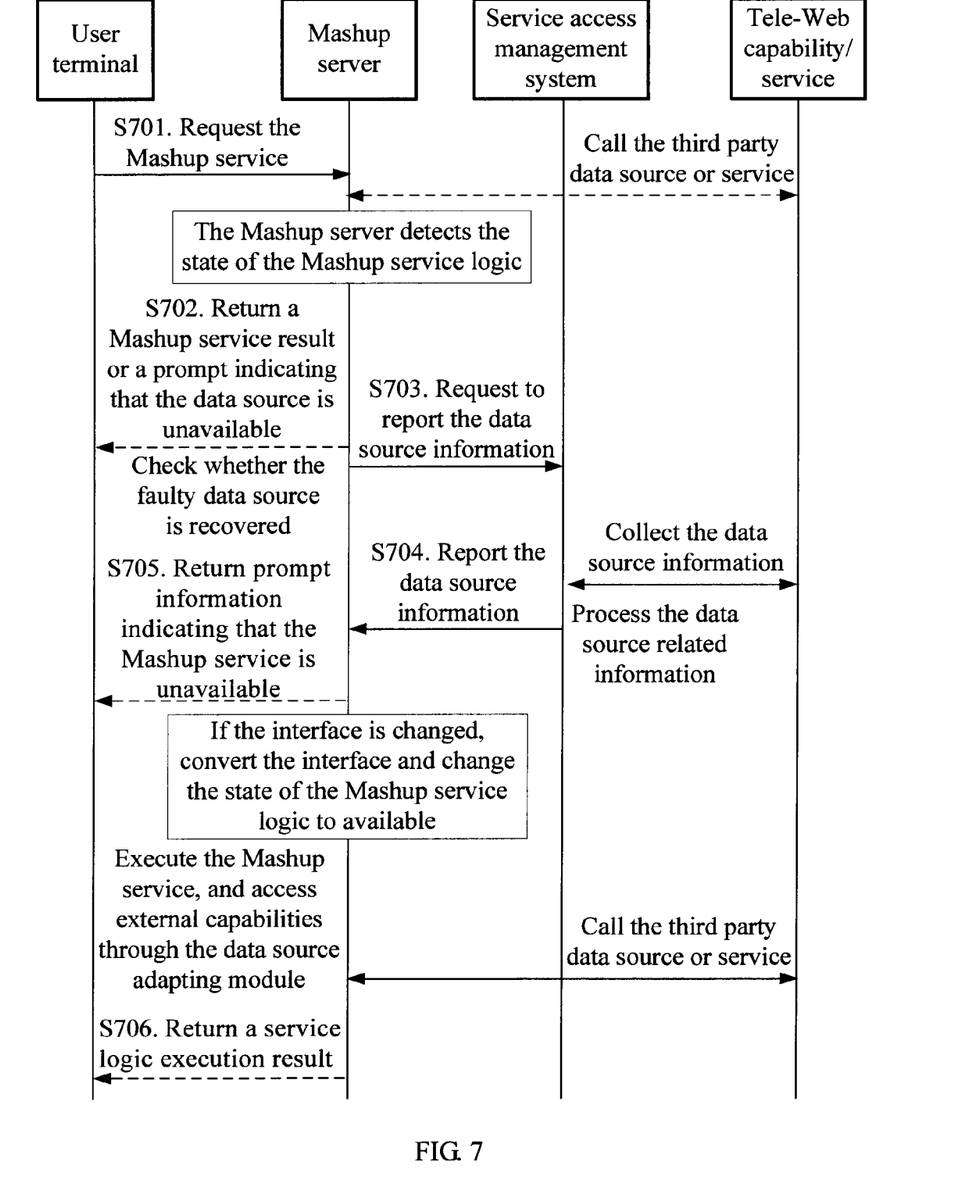
FIG. 7 shows a process of accessing a Mashup service based on the system according to a seventh embodiment of the present invention.

Based on the system provided in the fourth embodiment of the present invention, the seventh embodiment provides a process of accessing a Mashup service. As shown in FIG. 7, the process includes the following steps:

Step S701: The user requests to execute the Mashup service logic.

Step S702: The Mashup server detects the availability state of the service logic; if the service logic is available, the Mashup server executes the service logic; otherwise, the Mashup server judges the data source detection label. If the data is unavailable, the Mashup server returns prompt information indicating that the data is unavailable to the user; if the data source state needs to be further detected, the Mashup server executes subsequent steps.

Step S703: The Mashup server requests the service access management system to report the data source information. The service access management system performs related processing according to the collected data source information.

Step S704: The service access management system reports the data source information (including address and interface conversion rules and alternative sub service replacement rules).

Step S705: If the Mashup server finds that the data source state is abnormal, the Mashup server returns prompt information indicating that the Mashup service logic is unavailable to the user. If the address and interface of the data source are changed, the Mashup server updates the service logic address and interface calling code, and changes the state of the Mashup service logic to available. The Mashup server executes the updated service logic. The Mashup may access the third party private address and interface through the data source adapting module (the adaptation logic may be registered by a third party).

Step S706: The Mashup server returns a service logic execution result.

The technical solution provided in the seventh embodiment of the present invention has the following merits: The availability state of the data source is detected during the execution of the Mashup service, and the state information of the unavailable data source is updated. In this way, the user can know the state of the Mashup service when requesting a service, thus avoiding unnecessary service trials, saving system resources, and improving the user experience.

Embodiment 8

Figure 8:
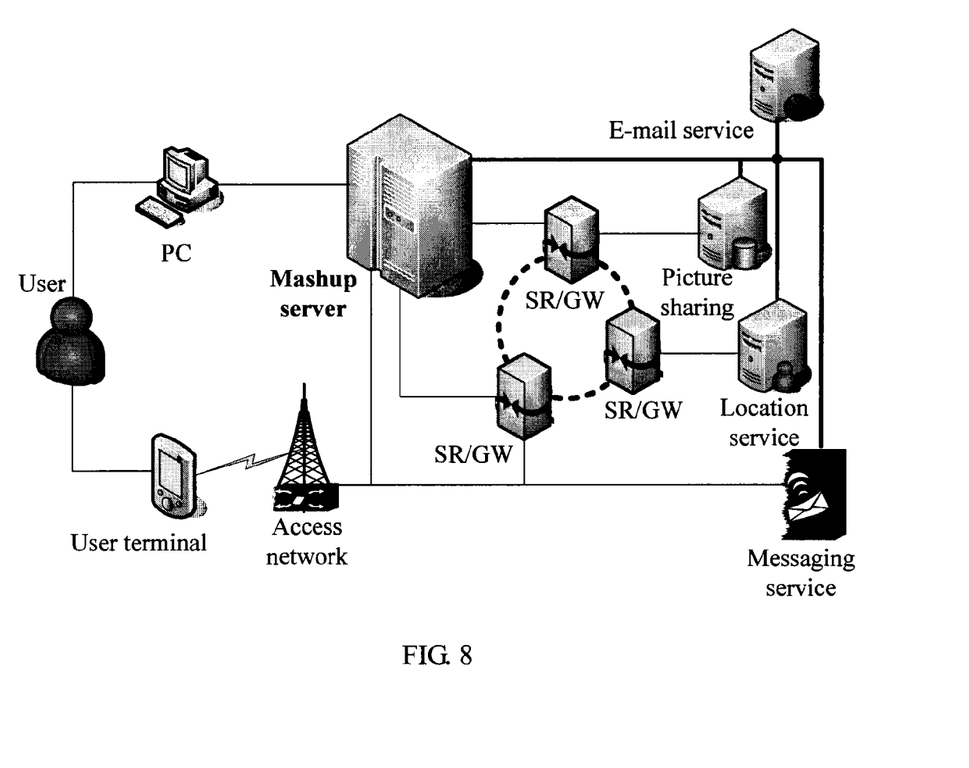
FIG. 8 shows a network structure of a Mashup service according to an embodiment of the present invention.

For better understanding of the technical solutions provided in the preceding embodiments, this embodiment provides a technical solution based on the network structure shown in FIG. 8. The technical solution is detailed as follows:

The user may access related services on the Mashup server through a personal computer (PC) or a mobile terminal. The user may create various Mashup services by using the service creating module provided by the Mashup server. In this embodiment, supposing user A wants to send a special card to his wife on a wedding anniversary, because user A has always been on business trips, he makes a perfect electronic rose in advance and publishes it to the picture sharing service. To send the prepared blessing information and card to his wife on the wedding anniversary, user A creates a Mashup application through the Mashup server in a hotel to send the card to the e-mail box of his wife automatically. The e-mail content is: "I am being+getlocation (the number of an information receive terminal)+"on a business trip. Today is our wedding anniversary, and I make a card for you. I hope you like this card." Meanwhile, user A sends a short message through his mobile phone to his wife, and obtains feedback information. The network service and networking involved in this embodiment are shown in FIG. 8. The service router (SR)/service gateway (GW) performs the function of the service access management system, and maintains related information such as the picture sharing service, location service, and multimedia messaging service. Logically, these SRs and GWs may be networked to provide better services and related applications. The Mashup server may subscribe to and query for information of related sub services through the SR and SW. Taking the messaging service as an example, to enable the Mashup server to call the messaging service easily, the messaging service provider registers a short message service (SMS) adaptation object with the data source adapter of the Mashup service. In this way, the user may send messages through a send (to, message) address and interface, where "to" refers to the destination, and "message" refers to the message content.

The following describes a service logic that user A creates by using the service creating module of the Mashup server:

```
*my mashup function sendEmail(to, message, attached=null)//send an e-mail
{
    var em =new Email( ),
      if(attached=null)
          em.send(to, message);
      else
          em.send(to, message, attached);
        im.disconnect( );
}
function sendSMS(from, to, message)//send a short message
{
    var sms = new SMS( );
    sms.send(to, message);
    sms.disconnect( );
}
function file getfile(name)//read the card
{
    var file = new file(name)
    return file;
}
function string getlocation(usr)
{
    var location = new LCS(usr)
    return location.getlocation( );
}
while (true)
{
    date = getDay( )
    If(date = "20080808")
      {
          File file = getfile(./rose.jpg);
          var message = "I am being" + getlocation (the number of the receiving
terminal) + (on a business trip. Today is our wedding anniversary, and I make a card for
you. I hope you like this card."
          sendEmail(wife@gmail.com, message, file)
```

```
        sendEmail (136XXXXXXXX, "I have sent an electronic card to you. Please
check it")
        sendEmail (135XXXXXXXX, "Send the electronic card successfully")
        exit;
    }
  }
}
```

The Mashup server stores state related information of the service logic.

```
<?xml version="1.0" encoding="UTF-8"?>
<mashups>
<name = "sendrose">
<state = "OK">
<checktag = "200808-08:08">
<subservice = "SMS">
<state = "OK">
<subservice>
<subservice = "Photos">
<state = "OK">
<subservice>
<subservice = "Location">
<staet = "OK">
<subservice>
</mashup>
```

The sub service information maintained by the SR or the GW may be the following messaging service content:

```
<?xml version="1.0" encoding="UTF-8"?>
<SubService>
<name = "Photos">
<state = "OK">
<subscribed = "Yes">
<InterfaceChanged = "NO">
<rule>
Null
</rule>
</InterfaceChanged>
</SubService>
```

In this way, user A may execute the preceding Mashup service logic to satisfy his requirement.

To further optimize the service, the messaging service provider wants to add the sender ID information, and changes the address and interface of the messaging service. The messaging service provider cares about which existing Mashup services call his service and is only responsible for publishing the new address and interface. The user may send messages through the send (from, to, message) address and interface, where the newly added "from" refers to the sender ID. In this way, the existing Mashup services may not continue to use the service. To facilitate the old service to convert the message, the messaging service provider publishes a rule for the conversion between new and old addresses and interfaces, and allows the old service to use "default" as the default parameter. The following gives an example of the conversion rule send.trans:

```
<?xml version="1.0" encoding="UTF-8"?>
<Transform>
<match = "SMS( )">
  <for-each select=var >
    <replace $var.send>
```

```
      $var.send(default, $parameter1, $parameter2)
    </replace>
  </for-each >
</Transform>
```

After collecting the state change of the SMS service information, the service access management system performs special processing according to related subscription requests. That is, it updates the SMS service state.

```
<?xml version="1.0" encoding="UTF-8"?>
<SubService>
<name = "Photos">
<state = "OK">
<subscribed = "Yes">
<InterfaceChanged = "NO">
<rule>
Send.trans
</rule>
</InterfaceChanged>
</SubService>
```

The service access management system reports the SMS service state information (including an address and interface conversion rule) to the Mashup server; if the Mashup server finds that the Mashup service of user A calls the messaging service according to the stored service state information, the Mashup server converts the Mashup service logic by using the data source address and interface converting module. The following shows a converted logic segment:

```
*my mashup
function sendEmail(to, message, attached=null)//send an e-mail
{
    var em = new Email( );
      if(attached=null)
          em.send(to, message);
      else
          em.send(to, message, attached);
          im.disconnect( );
}
function sendSMS(from, to, message)//send a short message
{
      var sms = new SMS( );
      sms.send(default, to, message);
      sms.disconnect( );
}
```

In conclusion, the method or algorithm provided in embodiments of the present invention may be implemented by hardware, a software module executed by a processor, or a combination thereof. The software module may be stored in a random access memory (RAM), memory, a read only memory (ROM), an electrically programmable ROM (EPROM), an electrically erasable programmable ROM (EE-PROM), a register, a hard disk, a removable magnetic disk, a compact disk-read only memory (CD-ROM), or any other storage medium known in this field.

The preceding embodiments describe the objective, technical solution, and benefits of the present invention in detail. It is understandable that these embodiments are some preferred embodiments and are not intended to limit the scope of protection of the present invention. It is apparent that those skilled in the art can make various modifications and variations to the invention without departing from the spirit and scope of the invention. The invention shall cover the modifications and variations provided that they fall within the scope of protection defined by the following claims or their equivalents.

What is claimed is:

1. A method for enhancing application reliability of a script-based service comprising:
    analyzing data source information of the script-based service;
    obtaining current state information of a data source of the script-based service according to the analysis result;
    determining an availability state of the script-based service according to the obtained current state information;
    storing the availability state of the script-based service;
    marking the availability state of the script-based service as available when the availability state of the script-based service is determined to be available;
    marking the availability state of the script-based service as unavailable when the availability state of the script-based service is determined to be unavailable and a state information conversion rule reported by a service access management fails to be received;
    performing conversion matching on the obtained current state information of the script-based service according to the state information conversion rule when the availability state of the script-based service is determined to be unavailable and the state information conversion rule reported by the service access management is received;
    marking the availability state of the script-based service as available when the conversion matching succeeds; and
    marking the availability state of the script-based service as unavailable when the conversion matching fails.

2. The method of claim 1, wherein analyzing the data source information of the script-based service is triggered by receiving a request for creating the script-based service from a user.

3. The method of claim 1, wherein analyzing the data source information of the script-based service is triggered by receiving a request for detecting the availability state of the script-based service.

4. The method of claim 3, wherein receiving the request for detecting the availability state of the script-based service comprises:
    judging whether to detect the availability state of the script-based service when receiving a request for executing the script-based service from a user and determining that the availability state of the script-based service is unavailable; and
    generating the request for detecting the availability state of the script-based service when the judgment result indicates that availability state of the script-based service is to be detected.

5. The method of claim 3, wherein receiving the request for detecting the availability state of the script-based service comprises receiving the request for detecting the availability state of the script-based service directly from a user.

6. The method of claim 1, wherein obtaining the current state information of the data source of the script-based service comprises:
    sending a state information subscription request for subscribing to the state information of the data source to the service access management system according to the analysis result of the data source of the script-based service; and
    receiving the current state information of the data source of the script-based service reported by the service access management system.

7. The method of claim 1, wherein before analyzing the data source information of the script-based service, the method further comprises:
    receiving a service adapter registration request sent from a third party data source; and
    accessing, by a script-based service server, private service data of the third party data source through the service adapter.

8. A script-based service server comprising:
    a processor configured to:
        analyze data source information of a script-based service;
        obtain current state information of a data source of the script-based service according to the analysis result;
        judge an availability state of the script-based service according to the current state information; and
        perform conversion matching on the current state information of the script-based service according to a state information conversion rule when the availability state of the script-based service is determined to be unavailable and the state information conversion rule reported by a service access management system is received.

9. The server of claim 8, wherein the processor is further configured to:
    receive a request for creating the script-based service from a user;
    receive a request for executing the script-based service from the user; or
    receive a request for detecting the availability state of the script-based service.

10. The server of claim 9, wherein the processor is further configured to generate a request for detecting the availability state of the script-based service according to the request for executing the script-based service received from the user.

11. The server of claim 10, wherein the processor is further configured to:
    identify the current availability state of the script-based service;
    judge whether to detect the availability state of the script-based service when the current availability state of the script-based service is determined to be unavailable; and
    generate the request for detecting the availability state of the script-based service when the judgment result indicates that the availability state of the script-based service needs to be detected.

12. The server of claim 8, wherein the processor is further configured to:
    send a state information subscription request for subscribing to the state information of the data source to the service access management system according to the analysis result; and
    receive the current state information of the data source of the script-based service reported by the service access management system and/or receive the information conversion rule reported by the service access management system.

13. The server of claim 8, wherein the processor is further configured to:

return a script-based service creation result to a user when a request for creating the script-based service is received from the user;

execute the script-based service when a request for executing the script-based service is received and the availability state of the script-based service is determined to be available; and return the script-based service execution result of to the user when the request for executing the script-based service is received from the user, or return a state detection result of the script-based service to the user when the request for detecting the availability state of the script-based service is received from the user.

14. The server of claim 8, wherein the processor is further configured to:

provide a non-open data source access function; and provide a third party service provider with a data source adapter such that the script-based service server can access a third party private data source.

15. A script-based service server comprising:

a processor configured to:

analyze data source information of a script-based service;

obtain current state information of a data source of the script-based service according to the analysis result;

judge an availability state of the script-based service according to the current state information;

receive a request for executing the script-based service from a user;

generate a request for detecting the availability state of the script-based service according to the request for executing the script-based service received from the user;

identify the availability state of the script-based service;

judge whether to detect the availability state of the script-based service when the current availability state of the script-based service is determined to be unavailable; and generate the request for detecting the availability state of the script-based service when the judgment result indicates that the availability state of the script-based service needs to be detected.

* * * * *

UNITED STATES PATENT AND TRADEMARK OFFICE
CERTIFICATE OF CORRECTION

PATENT NO. : 8,453,158 B2
APPLICATION NO. : 13/086835
DATED : May 28, 2013
INVENTOR(S) : Qifeng Ma and Xiaomin Shi It is certified that error appears in the above-identified patent and that said Letters Patent is hereby corrected as shown below:

In the Claims

Column 18, lines 57-67 - Claim 12 should read as follows:

12. The server of claim 9, wherein the processor is further configured to:
send a state information subscription request for subscribing to the state information of the data source to the service access management system according to the analysis result; and
receive the current state information of the data source of the script-based service reported by the service access management system and/or receive the state information conversion rule reported by the service access management system.

Signed and Sealed this
Twentieth Day of August, 2013

Teresa Stanek Rea
*Acting Director of the United States Patent and Trademark Office*